(12) United States Patent
Morita et al.

(10) Patent No.: US 7,782,505 B2
(45) Date of Patent: Aug. 24, 2010

(54) IMAGE READING APPARATUS AND CONTROL METHOD THEREFOR

(75) Inventors: Kenji Morita, Toride (JP); Shigemichi Hamano, Abiko (JP); Akiko Kanno, Kashiwa (JP); Atsushi Chaki, Tokyo (JP); Masahiro Serizawa, Toride (JP); Akira Morisawa, Kashiwa (JP); Hideyuki Ikegami, Abiko (JP); Satoshi Okawa, Toride (JP)

(73) Assignee: Canon Kabushiki Kaisha (JP)

( * ) Notice: Subject to any disclaimer, the term of this patent is extended or adjusted under 35 U.S.C. 154(b) by 740 days.

(21) Appl. No.: 11/763,050

(22) Filed: Jun. 14, 2007

(65) Prior Publication Data
US 2007/0291326 A1    Dec. 20, 2007

(30) Foreign Application Priority Data
Jun. 14, 2006  (JP) ............................. 2006-165065
Mar. 19, 2007  (JP) ............................. 2007-070861

(51) Int. Cl.
*H04N 1/04* (2006.01)
(52) U.S. Cl. ..................... 358/498; 358/448; 358/447; 358/497
(58) Field of Classification Search ................ 358/498, 358/448, 447, 497, 474
See application file for complete search history.

(56) References Cited

U.S. PATENT DOCUMENTS 7,064,874 B2 * 6/2006 Imai ........................... 358/498

2002/0048053 A1   4/2002 Imai
2003/0038983 A1   2/2003 Tanabe et al.

FOREIGN PATENT DOCUMENTS

| CN | 1353534 A | 6/2002 |
|---|---|---|
| JP | 3-55960 A | 3/1991 |
| JP | 5-153600 A | 6/1993 |
| JP | 2002-84403 A | 3/2002 |
| JP | 2002-135530 A | 5/2002 |
| JP | 2002-290685 A | 10/2002 |
| JP | 2003-101734 A | 4/2003 |
| JP | 2003-219172 A | 7/2003 |
| JP | 2003-244439 A | 8/2003 |
| JP | 2003-333327 A | 11/2003 |
| JP | 2004-180199 A | 6/2004 |
| JP | 2004-193743 A | 7/2004 |

OTHER PUBLICATIONS

Chinese Office Action dated Apr. 10, 2009, issued in corresponding Chinese Application No. 200710112114.5.

* cited by examiner

*Primary Examiner*—Houshang Safaipour
(74) *Attorney, Agent, or Firm*—Rossi, Kimms & McDowell LLP

(57) ABSTRACT

An image reading apparatus which enables reduction of time to be taken from a job start instruction to a reading operation start. An automatic document feeder unit feeds an original. An upstream reader reads an image on one side of the original fed by the automatic document feeder unit. A downstream reader is disposed downstream of the upstream reader in an original feeding direction, to read an image on another side of the original. The upstream reader and the downstream reader read images of respective white reference plates, and the image reading apparatus generates correction data for the upstream reader and the downstream reader based on the images of the respective white reference plates read by the upstream reader and the downstream reader.

12 Claims, 10 Drawing Sheets

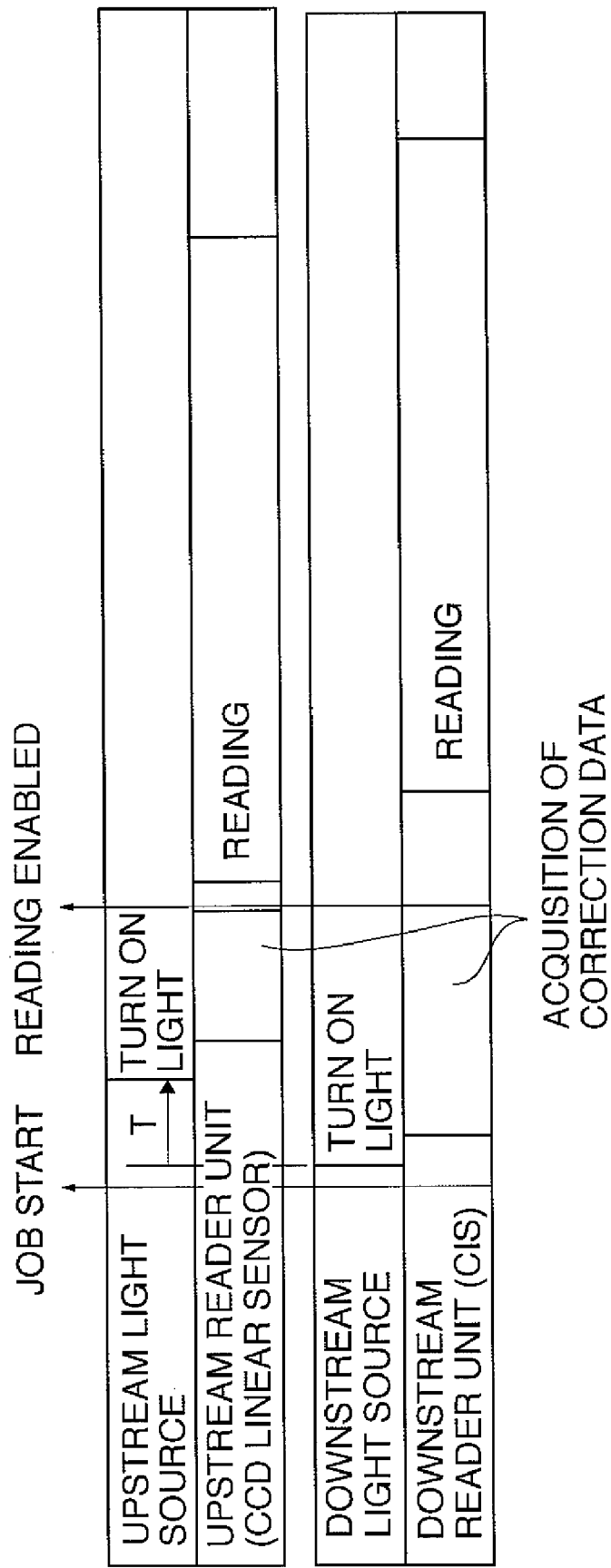

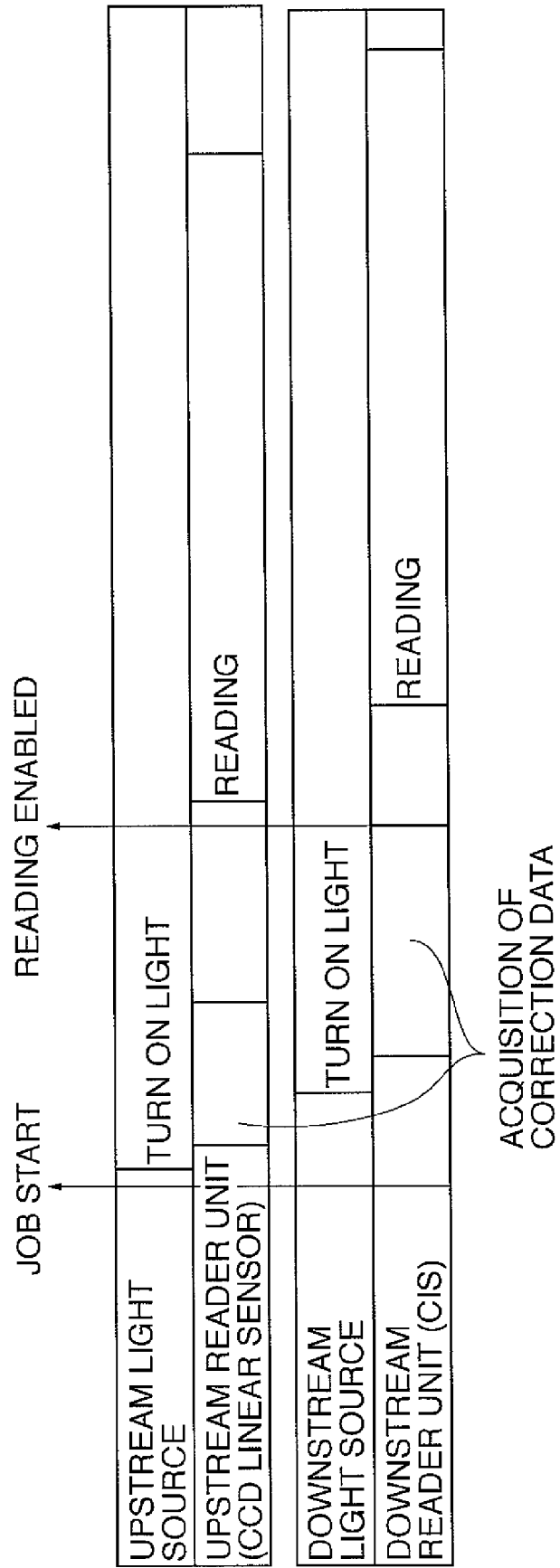

IMAGE READING APPARATUS AND CONTROL METHOD THEREFOR

BACKGROUND OF THE INVENTION

1. Field of the Invention

The present invention relates to an image reading apparatus and a control method therefor.

2. Description of the Related Art

Image reading apparatuses equipped with an automatic document feeder (ADF) are predominantly configured to read originals on a one side-by-one side basis. This type of image reading apparatus reads an image on the front side of an original while conveying the original, reverses the conveying direction of the original to invert the original by an inverting mechanism provided on the conveying path, and then reads the reverse side of the original while conveying the original again. Each original is thus conveyed to a reader unit twice, first with its front side facing the reader unit, and then with its reverse side facing the reader unit, whereby images on the respective front and reverse sides of the original are read.

The image reading apparatus of the above-mentioned type is required to perform an operation for reversing the original conveying direction after scanning the front side of an original, and an operation for inverting the original having its reverse side scanned so as to discharge the original from the apparatus in the same page order as before conveyance. Therefore, it takes time to read a double-sided original.

In order to reduce the time required for a double-sided original, there have been proposed image reading apparatuses in which two reader units are provided on a conveying path such that they can read the respective sides of an original without inversion of the original (see e.g. Japanese Laid-Open Patent Publication (Kokai) No. 2002-135530).

Each of the reader units of an image reading apparatus of the above-mentioned type is comprised of a light source and a reading sensor. In the image reading apparatus, the upstream light source with respect to the flow of fed originals is first turned on and then the downstream light source is turned on, so as to shorten a time period over which the light sources are kept on, to thereby enhance the energy-saving effect of the apparatus.

In general, the reading characteristics of a reading sensor change due to environmental changes including the lapse of time after the start of driving and a rise in temperature. For this reason, it is required to carry out shading correction for correcting unevenness of the reading sensitivity of the reading sensor in the transverse direction thereof. Time period required for acquisition of correction data for shading correction differs depending on the type of a scanner and the warm-up time of a light source. The typical types of scanners include a CCD scanner type and a CIS scanner type. The CCD scanner type scans an image on an original by moving a lamp and a mirror along the original, and then reads the original image zoomed out by a lens by a charge coupled device (hereinafter referred to as "the CCD sensor") thereof. On the other hand, the CIS scanner type scans an image on an original by moving a contact image sensor (hereinafter referred to as "the CIS") thereof relatively to the original to thereby read the scanned image of the original.

The CCD sensor of the CCD scanner can be reduced in size because it is configured to read a zoomed-out original image, and therefore it is possible to form the CCD sensor by a single sensor chip. On the other hand, a reading sensor of the CIS in the CIS scanner is configured to perform a reading operation in a state brought into contact with an original, and hence the reading sensor needs the same length as the width of the original. For this reason, the CIS scanner is required to be formed by a plurality of (e.g. sixteen) sensor chips arranged in the transverse direction of an original. This necessitates correction of density differences at junctures between adjacent ones of the sensor chips, and therefore it takes a longer time to acquire correction data for the CIS scanner than for the CCD scanner.

Let it be assumed that the CCD scanner is disposed on the upstream side of CIS scanner. As shown in FIG. 8, in response to a job start instruction, the upstream light source is turned on so as to start acquisition of correction data for the upstream reading sensor, and then the downstream light source is turned on so as to start acquisition of correction data for the downstream reading sensor. Only after acquisition of the correction data on both the upstream and downstream reading sensor, an original reading operation can be started. In this case, it takes a longer time to acquire correction data for the downstream CIS scanner which is turned on later than for the upstream CCD scanner which is turned on earlier. Therefore, it takes a long time to complete acquiring correction data for both of the upstream and downstream scanners after the start of the job is instructed.

SUMMARY OF THE INVENTION

The present invention provides an image reading apparatus which enables reduction of time from when a job start is instructed until a reading operation is started, and a control method for the image reading apparatus.

In a first aspect of the present invention, there is provided an image reading apparatus comprising an original feeder configured to feed an original, a first reader configured to read an image on one side of the original fed by the original feeder, a second reader disposed downstream of the first reader in a direction in which the original is fed by the original feeder and configured to read an image on another side of the original fed by the original feeder, and a controller configured to cause the first and second readers to read respective first and second reference objects, and generate first correction data for the first reader and second correction data for the second reader based on the respective first and second reference objects read by the first and second readers, wherein a time period required for reading the second reference object by said second reader and for generation of the second correction data is longer than a time period required for reading the first reference object by said first reader and for generation of the first correction data, and wherein the controller causes the second reader to start reading the second reference object before causing the first reader to start reading the first reference object.

With the configuration of the image reading apparatus according to the first aspect of the present invention, in acquiring data for correcting characteristics of the first and second readers thereof, the second illumination unit disposed on a downstream side is turned earlier than the first illumination unit disposed on an upstream side. This makes it possible to reduce time from the start of the job to the start of reading data for correcting the characteristics of the second reader, to thereby reduce the time taken to complete the reading of the correction data for the two readers.

In one embodiment of the present invention, the controller can cause the second reader to start reading the second reference object before causing the first reader to start reading the first reference object, such that generation of the first correction data is completed prior to or simultaneously with completion of generation of the second correction data.

In one embodiment of the present invention, the first reader can include a first illumination unit for illuminating the first reference object, and the second reader includes a second illumination unit for illuminating the second reference object, and the controller can cause the second illumination unit to start illuminating the second reference object before causing the first illumination unit to start illuminating the first reference object.

In one embodiment of the present invention, the first reader is of a CCD scanner type, and the second reader is of a CIS scanner type.

In one embodiment of the present invention, the first reader can have a reading sensor formed by a single sensor chip, and the second reader can have a reading sensor formed by a plurality of sensor chips arranged in a row.

In one embodiment of the present invention, the first reference object and the second reference object can be white reference plates, respectively.

In a second aspect of the present invention, there is provided an image reading apparatus comprising an original feeder configured to feed an original, a first reader configured to read an image on one side of the original fed by the original feeder, a first illumination unit configured to illuminate the original to be read by the first reader, a second reader disposed downstream of the first reader in a direction in which the original is fed by the original feeder and configured to read an image on another side of the original fed by the original feeder, a second illumination unit configured to illuminate the original to be read by the second reader, and a controller configured to cause the first and second readers to read respective first and second reference objects, and generate correction data for the first reader and correction data for the second reader based on the respective first and second reference objects read by the first and second readers, wherein a time period required for reading the second reference object by said second reader and for generation of the second correction data is longer than a time period required for reading the first reference object by said first reader and for generation of the first correction data, and wherein the controller causes the second illumination unit to start illuminating the second reference object before causing the first illumination unit to start illuminating the first reference object.

In a third aspect of the present invention, there is provided an image reading apparatus comprising an original feeder configured to feed an original, a first reader configured to read an image on one side of the original fed by the original feeder, the first reader being formed by a single reading sensor chip, a first illumination unit configured to illuminate the original to be read by the first reader, a second reader disposed downstream of the first reader in a direction in which the original is fed by the original feeder, and configured to read an image on another side of the original fed by the original feeder, the second reader being formed by a plurality of reading sensor chips arranged in a row, a second illumination unit configured to illuminate the original to be read by the second reader, and a controller configured to cause the first and second readers to read respective first and second reference objects, and generate correction data for the first reader and correction data for the second reader based on the respective first and second reference objects read by the first and second readers, wherein the controller causes the second illumination unit to start illuminating the second reference object before causing the first illumination unit to start illuminating the first reference object.

In a fourth aspect of the present invention, there is provided an image reading apparatus comprising an original feeder configured to feed an original, a first reader of a CCD type, which is configured to read an image on one side of the original fed by the original feeder, a first illumination unit configured to illuminate the original to be read by the first reader, a second reader of a CIS type, which is disposed downstream of the first reader in a direction in which the original is fed by the original feeder, and is configured to read an image on another side of the original fed by the original feeder, a second illumination unit configured to illuminate the original to be read by the second reader, and a controller configured to cause the first and second readers to read respective first and second reference objects, and generate correction data for the first reader and correction data for the second reader based on the respective first and second reference objects read by the first and second readers, wherein the controller causes the second illumination unit to start illuminating the second reference object before causing the first illumination unit to start illuminating the first reference object.

In a fifth aspect of the present invention, there is provided a control method for an image reading apparatus comprising an original feeder configured to feed an original, a first reader configured to read an image on one side of the original fed by the original feeder, the first reader being formed by a single reading sensor chip, a first illumination unit configured to illuminate the original to be read by the first reader, a second reader disposed downstream of the first reader in a direction in which the original is fed by the original feeder and configured to read an image on another side of the original fed by the original feeder, the second reader being formed by a plurality of reading sensor chips arranged in a row, and a second illumination unit configured to illuminate the original to be read by the second reader, the control method comprising the steps of causing the second illumination unit to start illuminating the second reference object before causing the first illumination unit to start illuminating the first reference object, causing the first and second readers to read respective first and second reference objects, and generating correction data for the first reader and correction data for the second reader based on the respective first and second reference objects read by the first and second readers.

In a sixth aspect of the present invention, there is provided an image reading apparatus comprising an original feeder configured to feed an original, a first reader configured to read an image on one side of the original fed by said original feeder, a second reader disposed downstream of said first reader in a direction in which the original is fed by said original feeder and configured to read an image on another side of the original fed by said original feeder, said second reader requiring a longer preparation period for reading the image than said first reader, and a controller configured to cause said second reader to start a preparation operation for reading the image before causing said first reader to start a preparation operation for reading the image.

In a seventh aspect of the present invention, there is provided an image reading apparatus comprising an original feeder configured to feed an original, a first reader configured to read an image on one side of the original fed by said original feeder, a first illumination unit configured to illuminate the original to be read by said first reader, a second reader disposed downstream of said first reader in a direction in which the original is fed by said original feeder and configured to read an image on another side of the original fed by said original feeder, said second reader requiring a longer preparation period for reading the image than said first reader, a second illumination unit configured to illuminate the original to be read by said second reader, and a controller configured to cause said second illumination unit to start an illuminating operation before causing said first illumination unit to start an illuminating operation.

The above and other objects, features, and advantages of the invention will become more apparent from the following detailed description taken in conjunction with the accompanying drawings.

BRIEF DESCRIPTION OF THE DRAWINGS

FIG. 6 is a timing diagram useful in explaining operational timing in the image reading apparatus, from a time point at which a job is started to a time point at which reading is enabled;

FIG. 8 is a timing diagram useful in explaining operational timing in a conventional image reading apparatus, from a time point at which a job is started to a time point at which reading is enabled.

DETAILED DESCRIPTION OF THE PREFERRED EMBODIMENTS

The present invention will now be described in detail below with reference to the accompanying drawings showing a preferred embodiment thereof.

An image reading apparatus according to the embodiment of the present invention is comprised of an automatic document feeder unit 100 (original feeder), a reader unit 200, and a controller 400. This image reading apparatus constitutes an image forming apparatus, and the image forming apparatus is applied to a scanner apparatus, a copying machine, a printer, a facsimile machine, etc.

Figure 1:
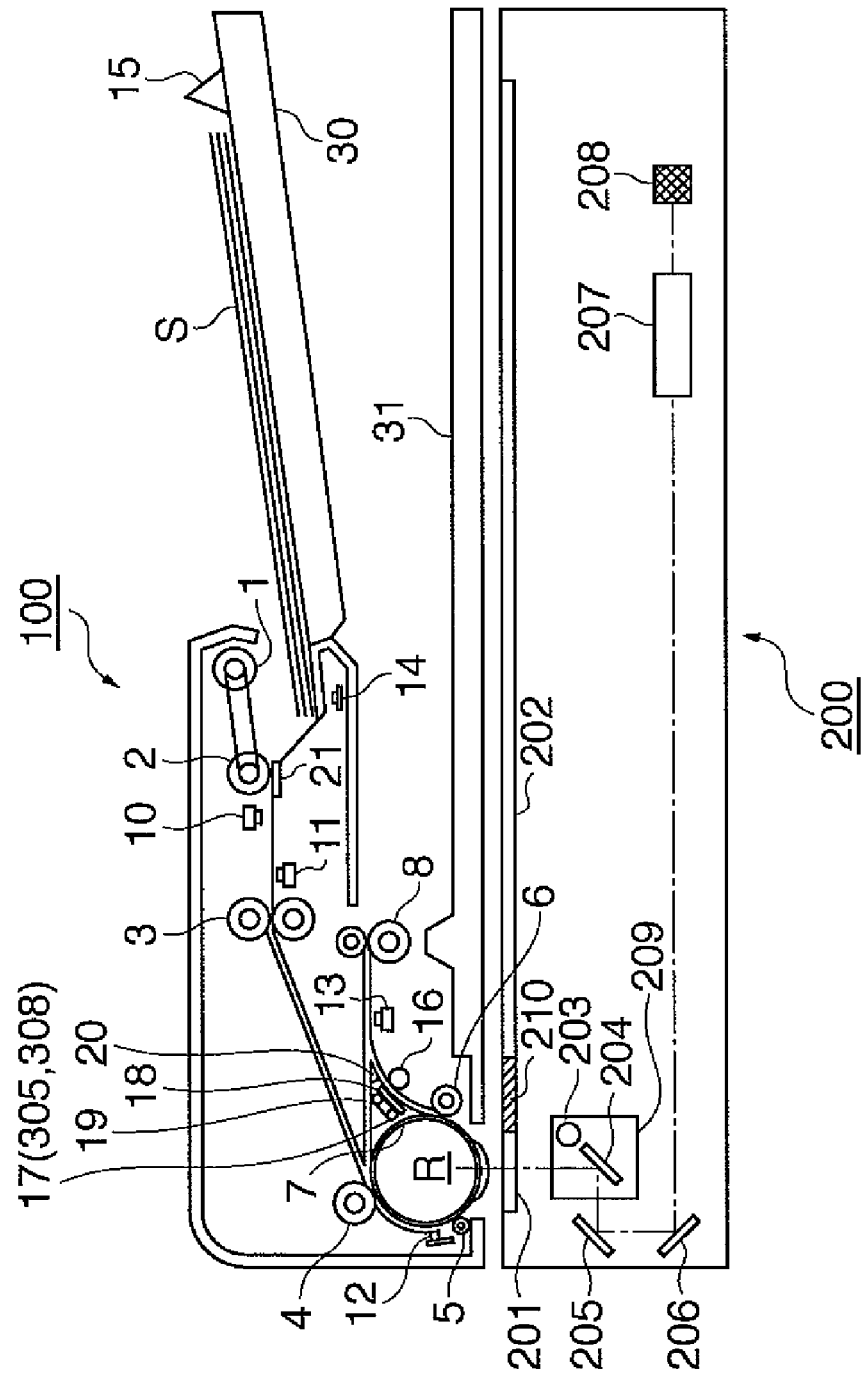
FIG. 1 is a cross-sectional view of an image reading apparatus including an automatic document feeder unit, according to an embodiment of the present invention.

First, the operation of the automatic document feeder unit 100 will be described with reference to FIG. 1. FIG. 1 is a schematic cross-sectional view of the automatic document feeder unit 100 and the reader unit 200.

The automatic document feeder unit 100 separates originals one by one from an original bundle S formed by at least two sheets placed on an original tray 30 and conveys each original to a reading position of the reader unit 200. When original feeding is to be started, a feed roller 1 is dropped onto the upper surface of the original bundle S. Then, the feed roller 1 performs rotation to feed an uppermost original of the original bundle S. If the uppermost original is dragging an original thereunder, only the uppermost original is separated by the function of a separation roller 2 and a separation pad 21. This separation is achieved by the well-known retard separation technique.

The original conveyed by the separation roller 2 and the separation pad 21 is conveyed to a registration roller 4 by a conveying roller pair 3, and the leading end of the original is brought into abutment with the registration roller 4 at rest. After the original is looped, the registration roller 4 performs rotation to convey the original, whereby skew of the original is corrected.

A feed path for conveying originals toward a moving original reading glass 201 extends downstream of the registration roller 4.

The original sent into the feed path is conveyed onto the moving original reading glass 201 by rollers 7 and 5. The original having one side (front side) thereof scanned on the moving original reading glass 201 is conveyed through between a roller 16 and a moving glass 18 by a large roller 7 and a conveying roller 6.

At this time, it is possible to read an image on the other side (reverse side) of the original by a reverse-side image reader 17 provided behind the moving glass 18. The original scanned by the reverse-side image reader 17 is discharged onto an original discharge tray 31 via a discharge flapper 20 and a discharge roller 8.

In the case of reading the reverse-side image without using the reverse-side image reader 17, the discharge flapper 20 is switched, with the trailing end of the original nipped by the discharge roller 8, and then the discharge roller 8 is reversely rotated to thereby guide the original into an inverting path 19. The original guided into the inverting path 19 is brought into abutment with the registration roller 4. The original is looped again, whereby skew thereof is corrected.

Thereafter, the original is guided onto the moving original reading glass 201 by rollers 7 and 5 again, whereby the reverse side of the original can be scanned on the moving original reading glass 201.

On the original tray 30, there is provided a guide stopper plate, not shown, which is slidable in a direction orthogonal to the original conveying direction. Further, an original width sensor, not shown, is provided for detecting the width of each original in accordance with the movement of the guide stopper plate. The size of originals forming the original bundle S placed on the original tray 30 can be detected by a combination of results of detection by the original width sensor and a sensor 11.

The reader unit 200 optically reads an image on the one side (front side) of the original, and photoelectrically converts the image to thereby generate image data. The reader unit 200 includes the moving original reading glass 201, a platen glass 202, a scanner unit 209 (a lamp 203 and a mirror 204), mirrors 205 and 206, a lens 207, and a CCD linear sensor 208.

The image on the one side (front side) of the original conveyed on the moving original reading glass 201 is illuminated with light from the lamp 203 (first illumination unit) and is read by the CCD linear sensor 208 via the mirrors 204, 205, and 206 and the lens 207. The lamp 203 is implemented by a xenon lamp. The CCD linear sensor 208 is formed by a single sensor chip, and reads an original image zoomed out by the lens 207.

A white reference plate 210 functions as a white level reference object for generating correction data (first correction data) for use in shading correction for the CCD linear sensor 208.

The reverse-side image reader 17 of the automatic document feeder unit 100 is disposed at a location downstream, as viewed in the conveying direction, of the moving original reading glass 201 of the reader unit 200 as an upstream reader, and functions as a downstream reader. The reverse-side image reader 17 is comprised of a lamp 305 and a CIS 308 (contact image sensor). An image on the other side (reverse side) of an original conveyed to the reverse-side image reader 17 is illuminated with light from the lamp 305 (second illumination unit) and is read by the CIS 308. The lamp 305 is implemented by a xenon lamp.

A surface of the moving glass 18, which faces the reverse-side image reader 17, is formed as a white reference plate (second white level reference object) functioning as a white level reference object for generating correction data (second correction data) for use in shading correction for the CIS 308. A reading sensor of the CIS 308, which requires a length equivalent to the width of an original, is formed by a plurality of (e.g. 16) sensor chips arranged in a row in the transverse direction of the original.

Next, the configuration of control sections of the image reading apparatus will be described with reference to FIG. 2.

Figure 2:
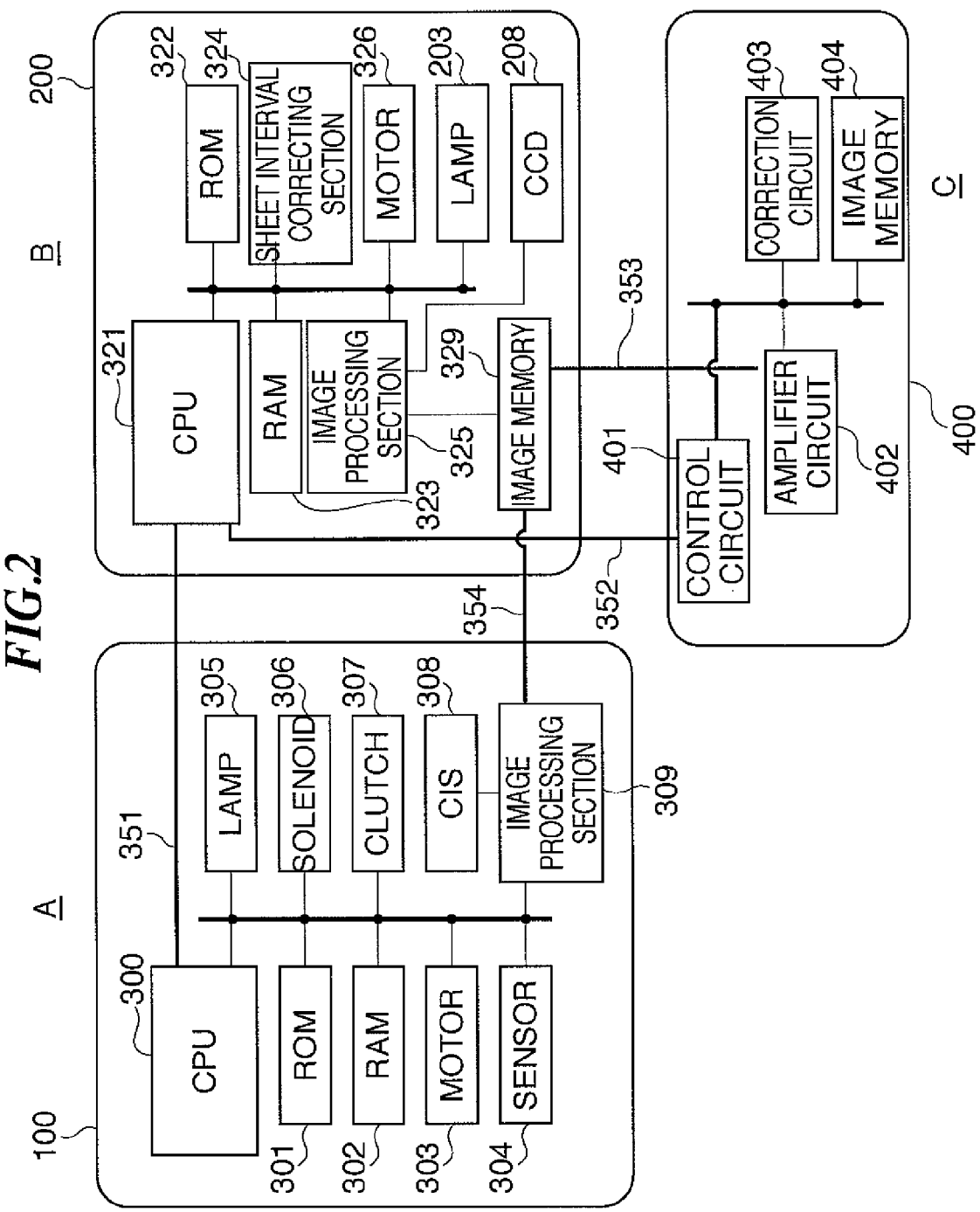
FIG. 2 is a block diagram of the image reading apparatus including the automatic document feeder.

A part A in FIG. 2 is a control block diagram of the automatic document feeder unit 100.

The automatic document feeder unit 100 includes a central processing unit (CPU) 300, a read only memory (ROM) 301, and a random access memory (RAM) 302. The ROM 301 stores a control program, and the RAM 302 stores input data and work data. A motor 303 for driving the original conveying rollers, a solenoid 306, and a clutch 307 are connected to output ports of the CPU 300, and various sensors 304 are connected to input ports of the CPU 300.

The CPU 300 performs control for conveying originals, based on the control program stored in the ROM 301. Further, the CPU 300 performs serial communication with a central processing unit (CPU) 321 of the reader unit 200 via a line 351 to exchange control data with the reader unit 200. An image leading end signal indicative of a sensed leading end of original image data is also delivered to the reader unit 200 via the communication line 351.

The lamp 305 and the light-receiving sensor (CIS) 308 are connected to the reverse-side image reader 17 appearing in FIG. 1, and an image read by the reverse-side image reader 17 is transferred to an image processing section 309.

A part B in FIG. 2 is a control block diagram of the reader unit 200. A CPU 321 controls the reader unit 200. A ROM 322 storing programs and a work RAM 323 are connected to the CPU 321. A motor driver 326 drives an optical system driving motor. The reader unit 200 includes the lamp 203 and the front-side image reader (CCD linear sensor) 208. The CPU 321 controls the reader unit 200 using the motor driver 326 and the CCD linear sensor 208. A sheet interval correcting section 324 performs sheet interval correction. An image processing section 325 performs various kinds of image processing on digital image data from the CCD linear sensor 208, and writes the processed data into an image memory 329.

Images processed by the image processing section 309 within the automatic document feeder unit 100 are also stored in the image memory 329 via an image communication line 354. Data written into the image memory 329 are sequentially sent to a controller 400 via an I/F section 353. Further, an image leading end signal indicative of a sensed leading end of original image data is delivered from the CPU 321 to the controller 400 via an I/F section 352. The image leading end signal delivered from the automatic document feeder unit 100 via the communication line 351 is also delivered from the CPU 321 to the controller 400 via the I/F section 352.

A part C in FIG. 2 is a circuit block diagram of the image processing controller. The controller 400 is comprised of a control circuit 401, an amplifier circuit 402, and a correction circuit 403.

Each of the CCD linear sensor 208 and the CIS 308 outputs an analog image signal on a one-line basis in an original image scanning process. The analog image signal is sent to the controller 400 via the associated one of the image processing sections 325 and 309 and the image memory 329. These signals are amplified by the amplifier circuit 402, and then sent to the correction circuit 403. In the correction circuit 403, correction processing (including shading correction performed using shading correction data described in detail hereinafter) is performed on each signal, and the corrected image signal is written into the image memory 404. The above-described processing is executed over a whole original image area, whereby an image read from each associated side of the original is formed.

Although in the present embodiment, the CIS is used in the reverse-side image reader of the automatic document feeder unit 100, and the CCD linear sensor is used in the front-side image reader of the reader unit 200, any sensors may be used as deemed appropriate insofar as they are capable of reading images.

The image reading apparatus according to the present embodiment has the following characterizing features: In the image reading apparatus, the automatic document feeder 100 (original feeder) feeds and conveys originals. The CCD linear sensor 208 (first reading unit) reads an image on one surface (front surface) of each original fed by the automatic document feeder 100. The CIS 308 (second reading unit) is disposed at a location downstream of the CCD linear sensor 208 in the direction of feeding of the original, and reads an image on the other side (reverse side) of the fed original. The CPU 321 causes the CCD linear sensor 208 and the CIS 308 to read the respective white reference plates (first and second white level reference objects), and forms the first correction data for the CCD linear sensor 208 and the second correction data for the CIS 308.

It is assumed that the time taken from the start of reading of the second white level reference object by CIS 308 to the completion of generation of the second correction data is longer than the time taken from the start of reading of the first white level reference object by CCD linear sensor 208 to the completion of generation of the first correction data. The CPU 321 causes the CIS 308 to start reading of the second white level earlier than it causes the CCD linear sensor 208 to start reading of the first white level reference object, so as to terminate the generation of the second correction data prior to or simultaneously with the termination of formation of the first correction data. The CPU 321 causes the lamp 305 to start illumination of the second white level reference object earlier than it causes the lamp 203 to start illumination of the first white level reference object.

The CCD linear sensor 208 has the lamp 203 (first illumination unit) for illuminating the first white level reference object with light. The CIS 308 has the lamp 305 (second illumination unit) for illuminating the second white level reference object with light. The CCD linear sensor 208 is of a CCD scanner type, while the CIS 308 is of a CIS scanner type. The CCD linear sensor 208 is formed by a single sensor chip, while the CIS 308 is formed by a plurality of chips arranged in a row.

Next, a description will be given of operation in a stationary original reading mode for reading an image printed on one side of an original (i.e. a single-sided original) by moving the scanner unit 209 in the sub scanning direction.

Figure 3A:
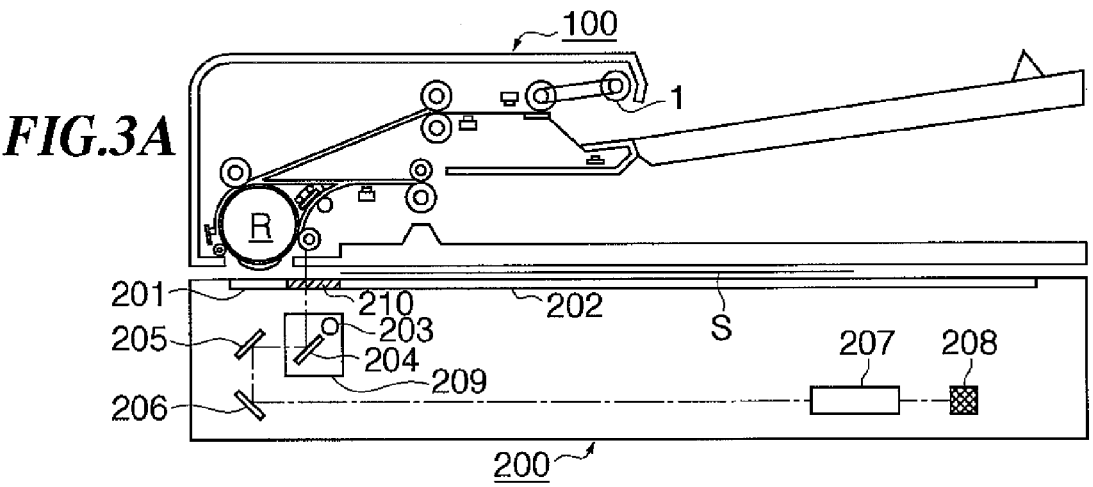
FIG. 3A is a view useful in explaining an operation carried out by the image reading apparatus in a stationary original reading mode.
Figure 3B:
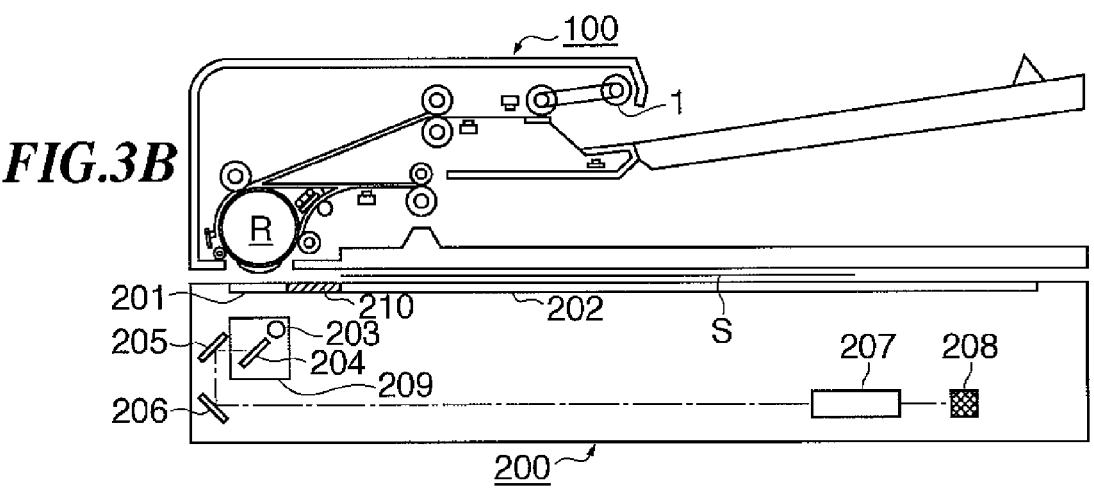
FIG. 3B is a view useful in explaining an operation in the stationary original reading mode, which follows the operation shown in FIG. 3A.
Figure 3C:
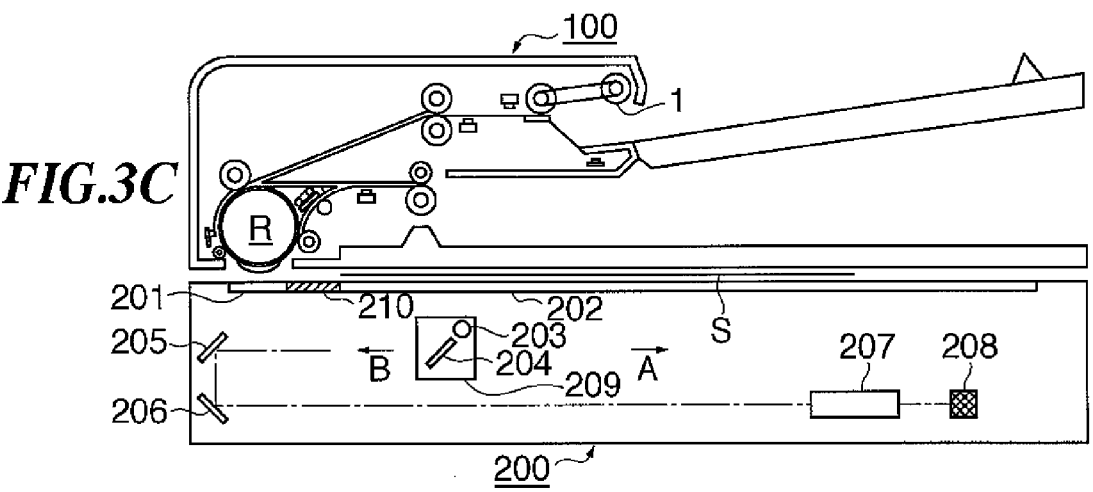
FIG. 3C is a view useful in explaining an operation in the stationary original reading mode, which follows the operation shown in FIG. 3B.

FIGS. 3A to 3C are schematic cross-sectional views showing the respective states of the scanner unit 209 in the stationary original reading mode executed by the reader unit 200.

As shown in FIG. 3A, when the reader unit 200 is instructed to start an image reading operation, the scanner unit 209 moves to a position directly below the white reference plate 210 for shading correction for the CCD linear sensor 208 to read an image of the white reference plate 210. This causes acquisition of shading correction data for correcting shading of image data from the CCD linear sensor 208 in the main scanning direction.

Then, the scanner unit 209 moves to a position in FIG. 3B, which allows for a sufficient distance for acceleration.

Then, the scanner unit 209 moves in a direction indicated by an arrow A in FIG. 3C (i.e. in the sub scanning direction), with the lamp 203 kept on. This causes reflected light from an original S illuminated with light from the lamp 203 to be read by the CCD linear sensor 208.

After reading up to the right end of the original S, as viewed in FIG. 3C, is completed, the lamp 203 is turned off. Then, the scanner unit 209 moves in a direction indicated by an arrow B in FIG. 3C to return to the state shown in FIG. 3A.

Next, a description will be given of operation in a moving original reading mode for reading an image on an original (a single-sided or double-sided original) by moving the original, with the scanner unit 209 held stationary. FIGS. 4A to 4F are schematic cross-sectional views showing the respective states of the scanner unit 209 and those of the original in the moving original reading mode executed by the reader unit 200.

When the automatic document feeder unit 100 is instructed to start feeding originals, the scanner unit 209 moves to the position directly below the white reference plate 210 for shading correction (see FIG. 4A) for the CCD linear sensor 208 to read the image of the white reference plate 210, whereby shading correction data for the CCD linear sensor 208 is acquired. Further, the image of the white reference plate on the moving glass 18 of the reverse-side image reader 17 is read by the CIS 308, whereby shading correction data for the CIS 308 is acquired.

Next, only an uppermost original of an original bundle is separated and sent to the registration roller 4 by the feed roller 1 dropped onto the upper surface of the original, the separation roller 2, and the conveying roller pair 3. At this time, the scanner unit 209 moves to a position directly below a point R (see FIG. 4B).

Figure 4A:
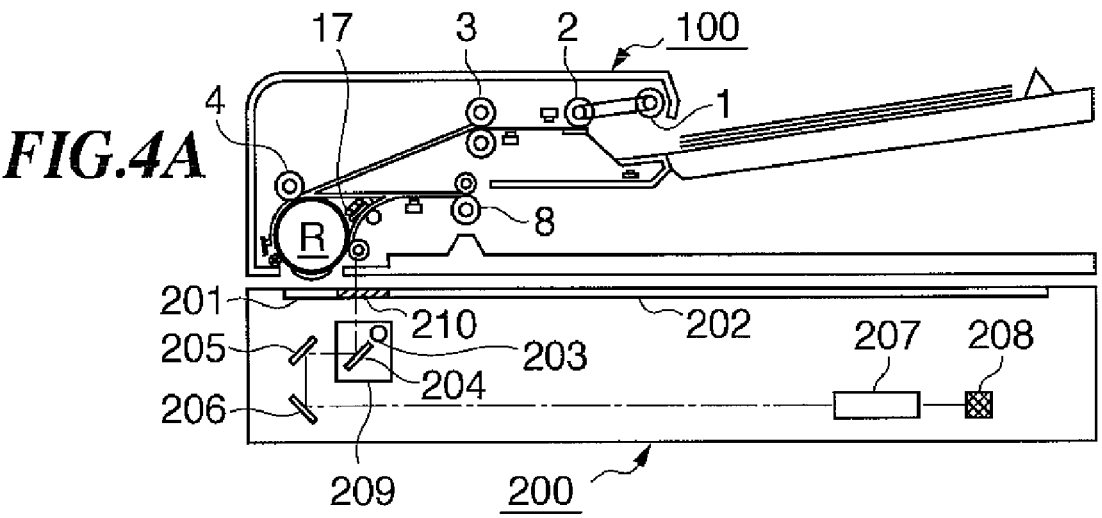
FIG. 4A is a view useful in explaining an operation carried out by the image reading apparatus in a moving original reading (one sided/double-sided) mode.
Figure 4B:
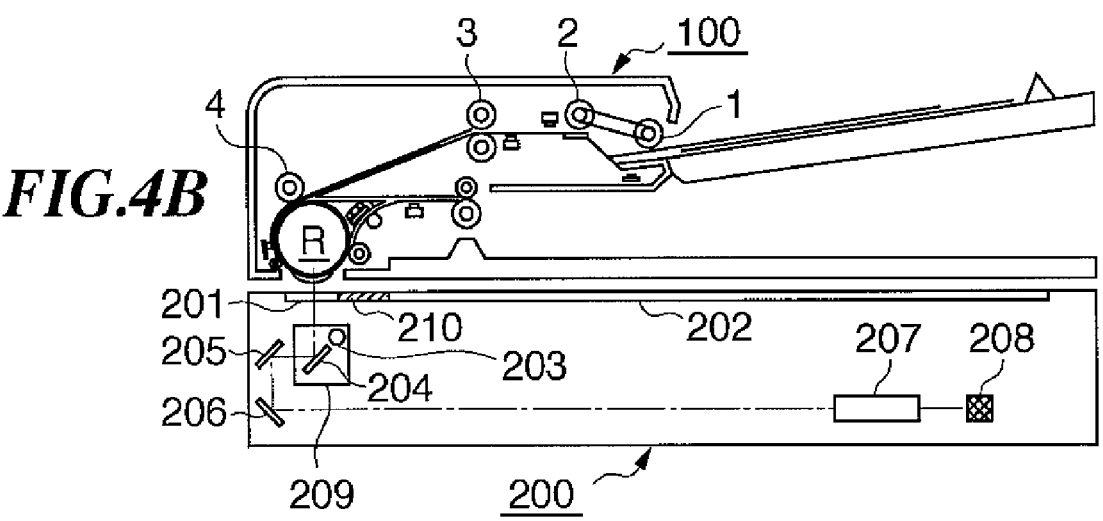
FIG. 4B is a view useful in explaining an operation in the moving original reading mode, which follows the operation shown in FIG. 4A.
Figure 4C:
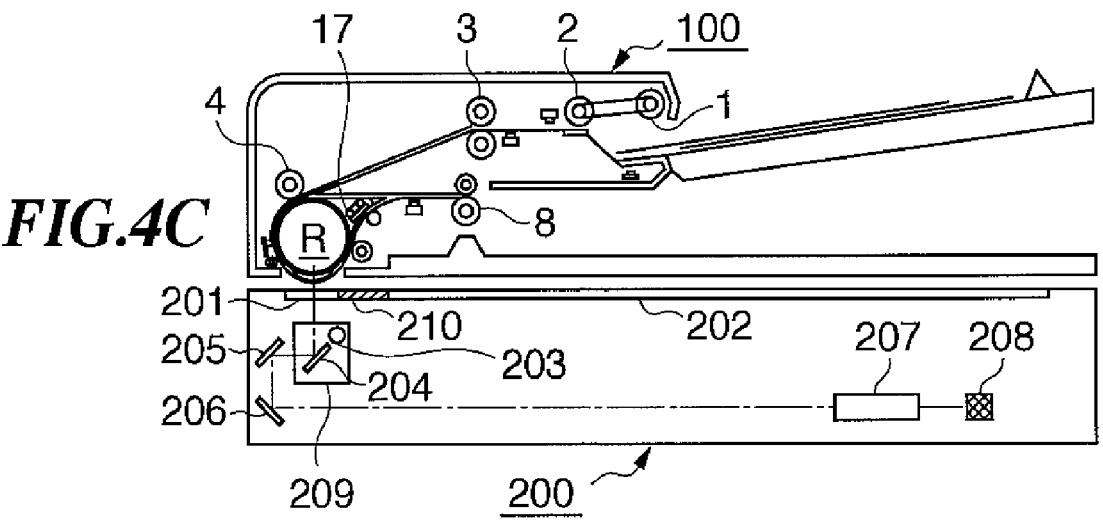
FIG. 4C is a view useful in explaining an operation in the moving original reading mode, which follows the operation shown in FIG. 4B.

The original is guided by the registration roller 4 onto the moving original reading glass 201 via the feed path (see FIG. 4C). The original is conveyed around the point R at a predetermined speed, whereby the image on the original is read by the scanner unit 209 on standby below the point R. At the same time, the automatic document feeder unit 100 delivers the image leading end signal, which is a signal indicative of the start of reading operation, to the image reader unit 200 in timing synchronous with passage of the leading end of the original over the point R.

Figure 4D:
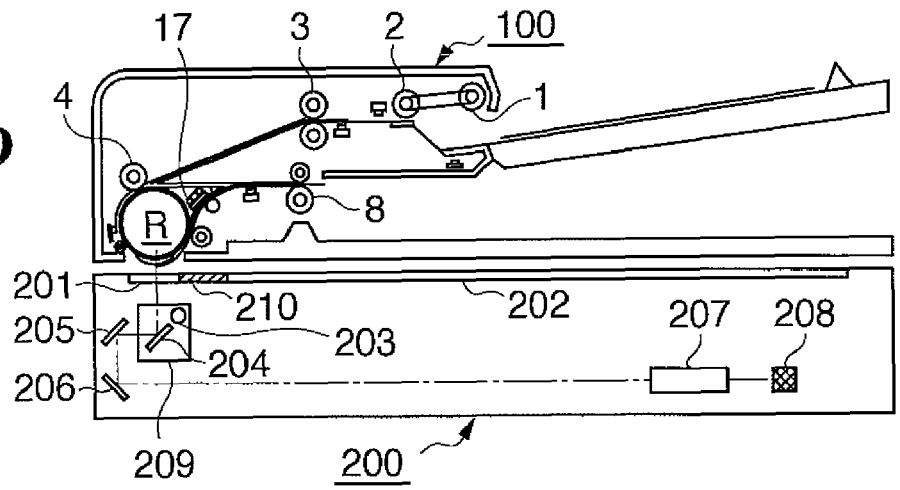
FIG. 4D is a view useful in explaining an operation in the moving original reading mode, which follows the operation shown in FIG. 4C.
Figure 4E:
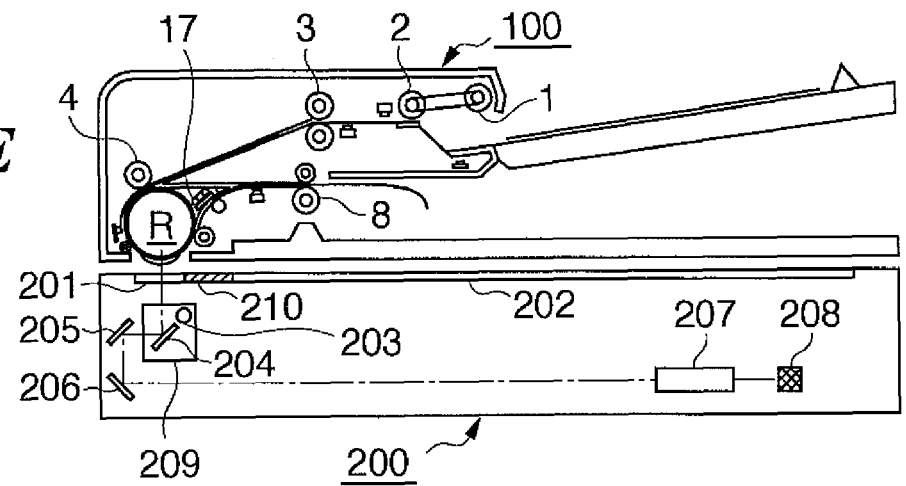
FIG. 4E is a view useful in explaining an operation in the moving original reading mode, which follows the operation shown in FIG. 4D.

In a simultaneous double-sided reading mode, while the front-side image on an original is being read by the scanner unit 209, the reverse-side image on the original is read by the reverse-side image reader 17 (see FIGS. 4D and 4E).

Figure 4F:
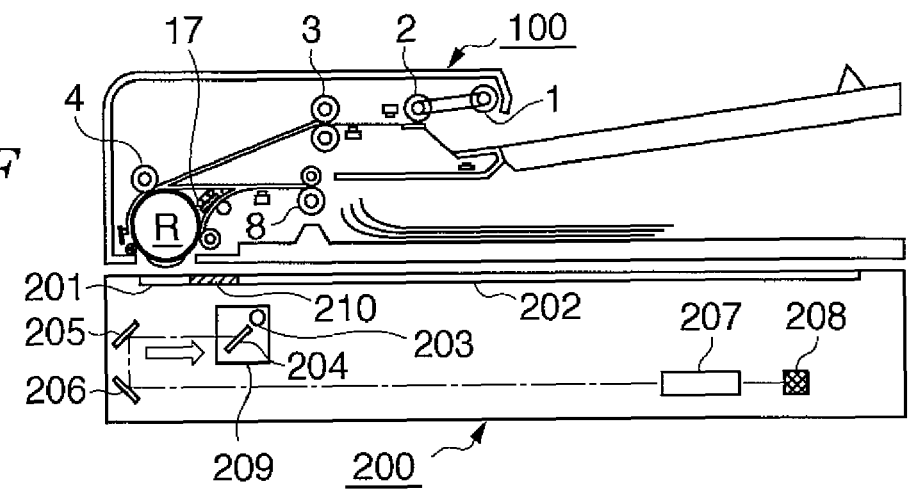
FIG. 4F is a view useful in explaining an operation in the moving original reading mode, which follows the operation shown in FIG. 4E.

After the reverse-side image reader 17 completes scanning of the reverse side of the original, the original having been scanned continues to be conveyed rightward, as viewed in FIG. 4F, to be discharged by the discharge roller 8.

When the trailing end of an N-th original has passed through the conveying roller pair 3, feeding of an (N+1)-th original of the original bundle placed on the original tray 30 is started (see FIG. 4D). At this time, timing for starting the registration roller 4 is controlled to adjust an interval from the preceding original, whereby the originals are conveyed on the moving original reading glass 201 at predetermined intervals.

When discharge of the original is completed, the scanner unit 209 moves in a direction indicated by an arrow in FIG. 4F, and then stops in a position shown in FIG. 4F.

Next, a description will be given of an operation for inverting an original, in a moving inverted original reading mode. In this case, during the reading of the N-th original, the (N+1)-th original is not fed and the reverse-side image reader is not used. FIGS. 5A to 5F are schematic cross-sectional views showing the respective states of the scanner unit 209 in the moving inverted original reading mode of the image reading apparatus.

Figure 5A:
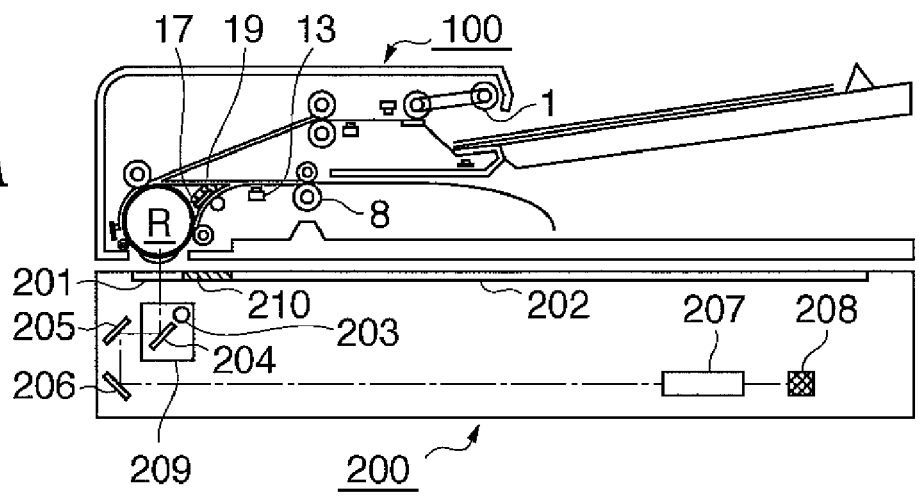
FIG. 5A is a view useful in explaining an operation carried out by the image reading apparatus in an inverted original reading mode.

When an original is conveyed by the sequential operations shown in FIGS. 4A to 4F, and the trailing end of the original is detected by the sensor 13, the discharge roller 8 stops in a state nipping the original (see FIG. 5A).

Figure 5B:
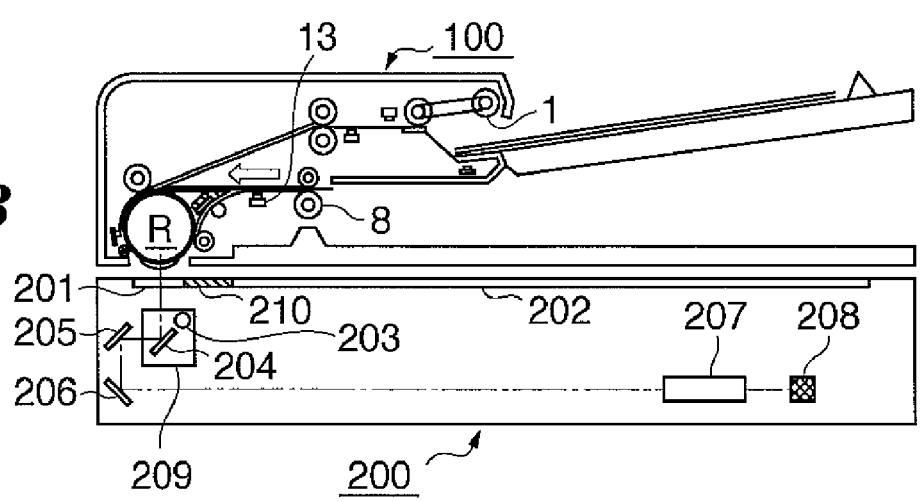
FIG. 5B is a view useful in explaining an operation in the inverted original reading mode, which follows the operation shown in FIG. 5A.
Figure 5C:
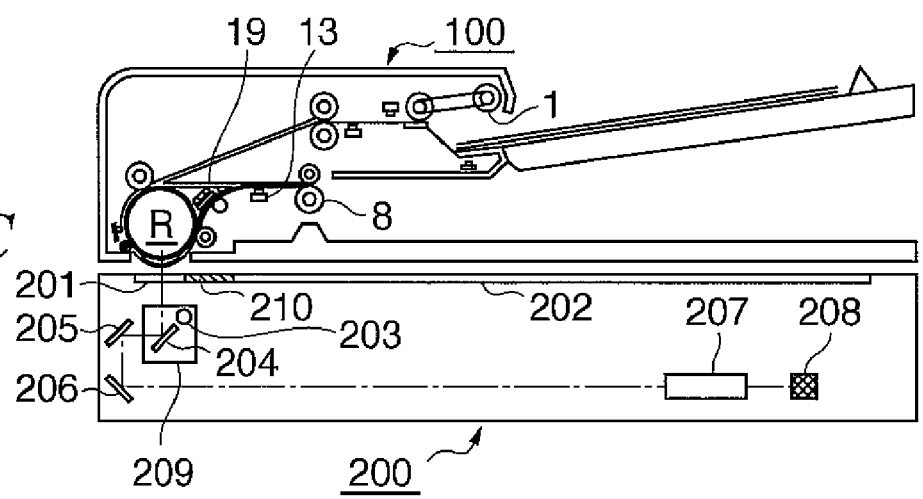
FIG. 5C is a view useful in explaining an operation in the inverted original reading mode, which follows the operation shown in FIG. 5B.

The discharge roller 8 rotates in a direction opposite to a discharging direction, whereby the original is conveyed in a direction indicated by an arrow in FIG. 5B.

Figure 5D:
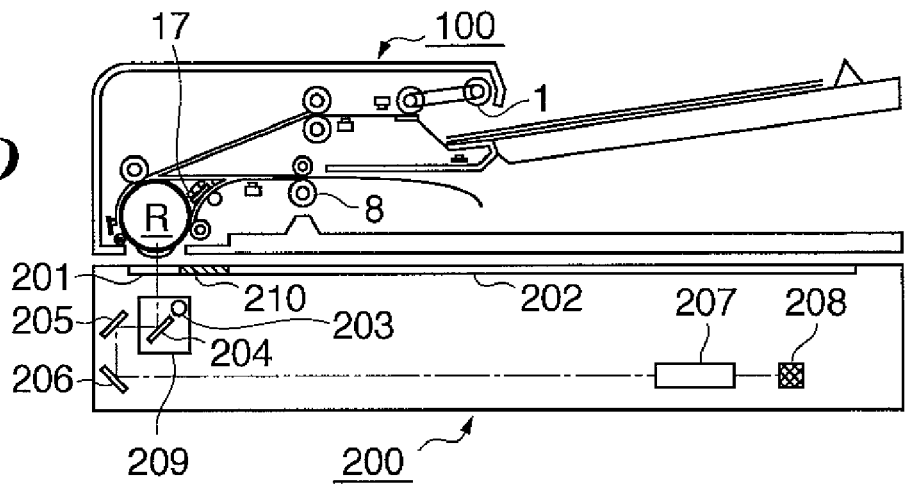
FIG. 5D is a view useful in explaining an operation in the inverted original reading mode, which follows the operation shown in FIG. 5C.

After the reverse side of the original is scanned while being conveyed about the point R (see FIG. 5C), when the trailing end of the original is detected by the sensor 13, the discharge roller 8 stops in a state nipping the original (see FIG. 5D).

Figure 5E:
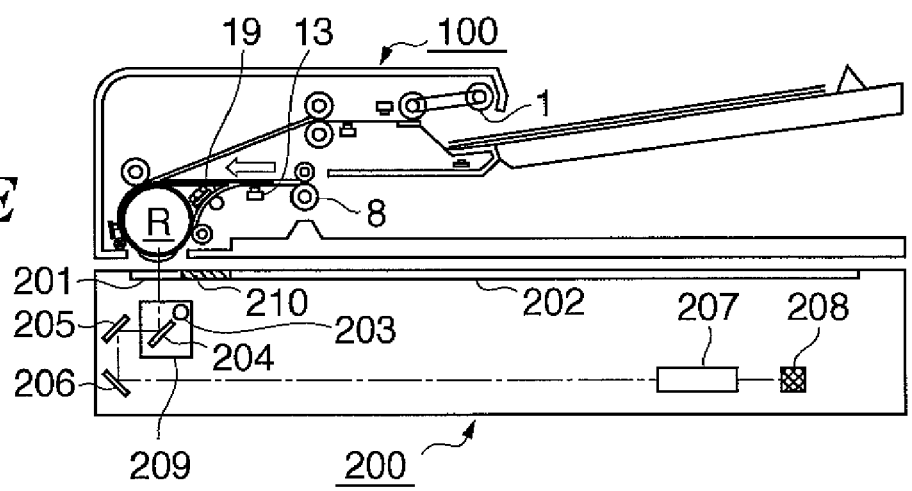
FIG. 5E is a view useful in explaining an operation in the inverted original reading mode, which follows the operation shown in FIG. 5D.

By rotating the discharge roller 8 in the opposite direction again, the original is conveyed in a direction indicated by an arrow in FIG. 5E, whereby the original is inverted upside down.

Figure 5F:
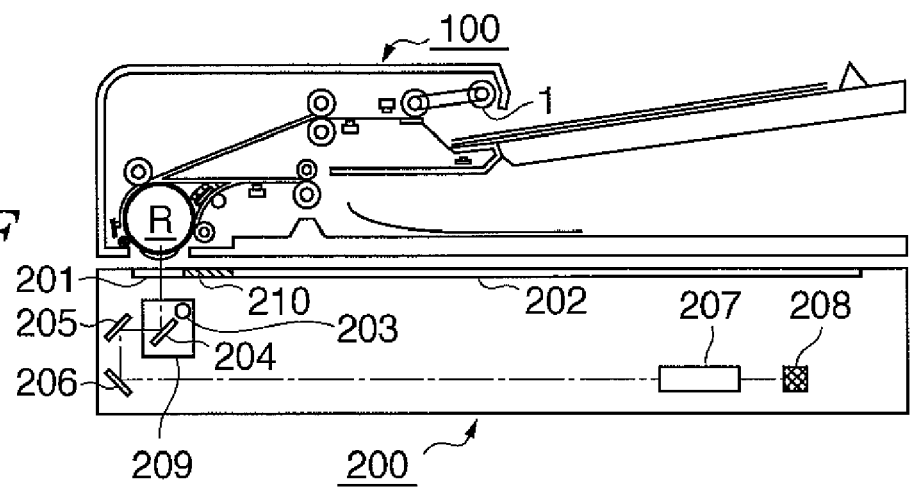
FIG. 5F is a view useful in explaining an operation in the inverted original reading mode, which follows the operation shown in FIG. 5E.

After inversion of the original is completed, separation of the succeeding original on the original tray is started (see FIG. 5F).

FIG. 6 is a timing diagram useful in explaining timing for acquisition of shading correction data in the simultaneous double-sided reading mode. The shading correction data acquisition, which will be described in detail hereafter, includes a turn-on and warm-up of the lamp, scanning of the white reference plate, and generation of correction data for use in shading correction.

As described hereinbefore, in the present embodiment, the CCD scanner type (CCD linear sensor 208) is employed in the reader unit 200 as the upstream reader, and the CIS scanner type (CIS 308) is employed in the reverse-side image reader 17 as the downstream reader. The CCD linear sensor 208 of the upstream reader is formed by a single sensor chip, whereas the CIS 308 of the downstream reader is formed by a plurality of sensor chips. In the case where an image reader is formed by a plurality of sensor chips, it is required to generate correction data not only for shading correction in each reader part formed by a single sensor chip, but also for correction of density differences in junctures between adjacent ones of the sensor chips.

Further, in order to make image density uniform on both the front and reverse sides of an original, correction data for the downstream reader is generated such that the result of shading correction of image data acquired by the downstream reader will match the result of shading correction of image data acquired by the upstream reader.

For the above reason, it takes more time to read the reference object and to generate correction data for the downstream reader than for the upstream reader.

Therefore, in the present embodiment, acquisition of shading correction data for the downstream reader is started "a time period T" earlier than acquisition of shading correction data for the upstream reader. The time period T is set in advance such that generation of correction data for the upstream reader is completed prior to or simultaneously with completion of generation of correction data for the downstream reader.

The time period T in FIG. 6 corresponds to the difference between time taken for the upstream reader (CCD linear sensor 208) to acquire shading correction data after turn-on of the lamp 203 and time taken for the downstream reader (CIS 308) to acquire shading correction data after turn-on of the lamp 305.

The time period T (e.g. 500 msec in the present embodiment) is stored as a fixed value in advance in the ROMs 301 and 322. A xenon lamp implementing each of the lamps 203 and 305 takes a warm-up time before it emits a constant amount of light, and therefore acquisition of shading correction data for each reader is started after the lapse of the warm-up time. The upstream light source (lamp 305) is turned on when the time period T has elapsed after turn-on of the downstream light source (lamp 203).

Reading of an original is started after acquisition of correction data for both the upstream reader (CCD linear sensor 208) and the downstream reader (CIS 308) is completed.

If it is detected, during acquisition of shading correction data for the upstream reader, that there exists paper dust or the like obstacle in the reading position of the upstream reader, it is required to cope with the obstacle e.g. by moving the scanner unit 209 by a predetermined amount. In this case, after the measures against obstacle are taken, reading of the original is started.

Figure 7:
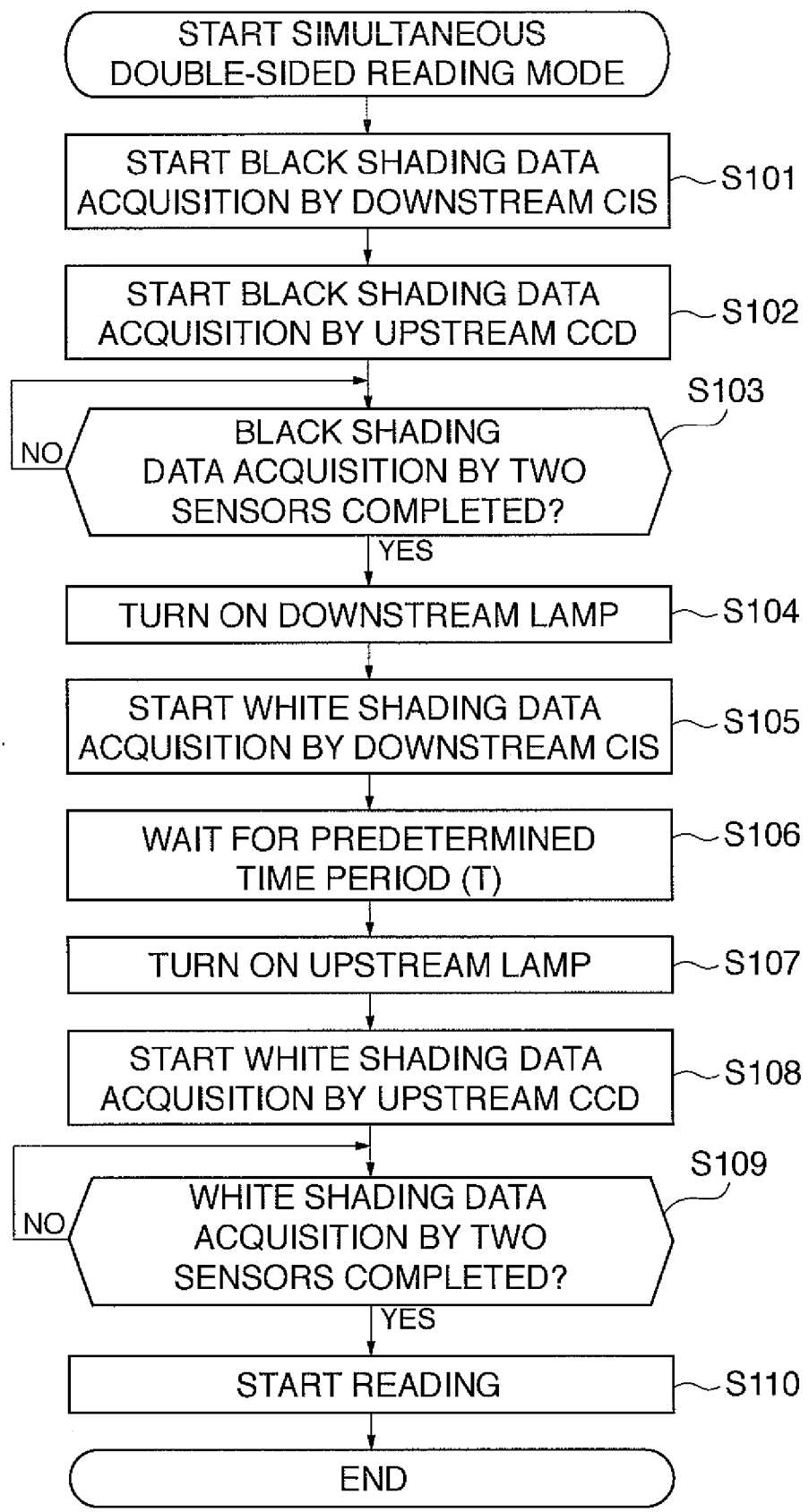
FIG. 7 is a flowchart of a process from the start of a job to the start of a reading operation in a simultaneous double-sided reading mode of the image reading apparatus.

FIG. 7 is a flowchart of a process from the start of a job to the start of a reading operation in the simultaneous double-sided reading mode of the image reading apparatus. The present process is basically executed by the CPU 300 and the CPU 321. When the reader unit 200 is instructed to enter a double-sided mode and at the same time a simultaneous reading mode, a job is started in the simultaneous double-sided reading mode.

First, black shading correction data for adjusting the black level of each of the reading sensors is acquired with the upstream and downstream lamps 203 and 305 kept off (steps S101 and S102). When the acquisition of the black shading correction data for the two reading sensors is completed (step S103), the downstream lamp 305 is turned on (step S104). Next, after the lapse of the warm-up time of the downstream lamp 305, acquisition of downstream white shading correction data is started (step S105). When the predetermined time period T has elapsed after the start of lighting (turn-on) of the downstream lamp (step S106), the upstream lamp is turned on (step S107). Similarly, acquisition of upstream white shading correction data is started (step S108) after the lapse of the warm-up time of the upstream lamp 203. Then, after acquisition of both the downstream white shading correction data and the upstream white shading correction data is completed (step S109), an original conveying operation for starting a reading operation and the reading operation itself are carried out (step S110), followed by terminating the job in the simultaneous double-sided reading mode.

As described in detail heretofore, according to the present embodiment, when a user gives an instruction for carrying out a double-sided reading operation, first, the downstream light source is turned on, and acquisition of downstream white shading correction data is started, and thereafter, acquisition of upstream white shading correction data is started. This causes the acquisition of the downstream white shading correction data and the acquisition of the upstream white shading correction data to be performed in parallel. Therefore, it is possible to set timing for completing the acquisition of the upstream white shading correction data close to timing for completing the acquisition of the downstream white shading correction data. Further, timing for acquiring white shading correction data for each of the upstream reader and the downstream reader can be set close to timing for starting reading of an original, which makes it possible to reduce influence of changes in the reading characteristics of the readers. Therefore, it is possible to make upstream white shading correction data more accurate than in the case where acquisition of upstream white shading correction data is performed prior to acquisition of downstream white shading correction data, to thereby improve the quality of images read from originals. Further, since the time period from a time point at which the user gives an instruction for starting a reading operation to a time point at which reading of an original is started can be reduced, it is possible to shorten a time period required to complete the reading operation.

Although in the above described embodiment, both the upstream lamp and the downstream lamp are each implemented by a xenon lamp, it is also possible to employ a fluorescent lamp or a light-emitting diode. If different types of lamps are employed in the respective upstream and downstream readers, the time period T should be so set as to allow for a difference in warm-up time between the two lamps.

Further, a white reference sheet whose front and reverse surfaces are white may be used as a reference object for white shading correction of image data formed by the upstream and downstream readers in place of the white reference plates. In this case, the automatic document feeder unit 100 is caused to feed the white reference sheet prior to original reading, and the white reference sheet is read in predetermined timing such that the front surface thereof serves as a reference object for the upstream reader and the reverse surface functions as a reference object for the downstream reader.

In the above described embodiment, a time period required for reading the white reference plate by the downstream reader and for acquisition of the downstream shading correction data is longer than a time period required for reading the white reference plate by the upstream reader and for acquisition of the upstream shading correction data. The present invention is also applicable to the image reading apparatus in which the downstream reader requiring a longer preparation period for reading the image than the upstream reader. The preparation for reading image includes an auto adjustment for image sensors of upstream and downstream readers and a warm-up for upstream and downstream illumination units.

In this case, the CPU causes the downstream reader to start a preparation operation for reading the image before causing the upstream reader to start a preparation operation for reading the image. The CPU may cause the downstream illumination unit to start an illuminating operation before causing the upstream illumination unit to start an illuminating operation.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy® disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-165065, filed Jun. 14, 2006, and Japanese Patent Application No. 2007-07086, filed Mar. 19, 2007, which are hereby incorporated by reference herein in their entirety.

What is claimed is:

1. An image reading apparatus comprising:
   an original feeder configured to feed an original;
   a first reader configured to read an image on one side of the original fed by said original feeder;
   a second reader disposed downstream of said first reader in a direction in which the original is fed by said original feeder and configured to read an image on another side of the original fed by said original feeder; and
   a controller configured to cause said first and second readers to read respective first and second reference objects, and generate first correction data for said first reader and second correction data for said second reader based on the respective first and second reference objects read by said first and second readers,
   wherein a time period required for reading the second reference object by said second reader and for generation of the second correction data is longer than a time period required for reading the first reference object by said first reader and for generation of the first correction data, and
   wherein said controller causes said second reader to start reading the second reference object before causing said first reader to start reading the first reference object.

2. An image reading apparatus as claimed in claim 1, wherein said controller causes said second reader to start reading the second reference object before causing said first reader to start reading the first reference object, such that generation of the first correction data is completed prior to or simultaneously with completion of generation of the second correction data.

3. An image reading apparatus as claimed in claim 1, wherein said first reader includes a first illumination unit for illuminating the first reference object, and said second reader includes a second illumination unit for illuminating the second reference object, and
   wherein said controller causes said second illumination unit to start illuminating the second reference object before causing said first illumination unit to start illuminating the first reference object.

4. An image reading apparatus as claimed in claim 1, wherein said first reader is of a CCD scanner type, and said second reader is of a CIS scanner type.

5. An image reading apparatus as claimed in claim 1, wherein said first reader has a reading sensor formed by a single sensor chip, and said second reader has a reading sensor formed by a plurality of sensor chips arranged in a row.

6. An image reading apparatus as claimed in claim 1, wherein the first reference object and the second reference object are white reference plates, respectively.

7. An image reading apparatus comprising:
   an original feeder configured to feed an original;
   a first reader configured to read an image on one side of the original fed by said original feeder;
   a first illumination unit configured to illuminate the original to be read by said first reader;
   a second reader disposed downstream of said first reader in a direction in which the original is fed by said original feeder and configured to read an image on another side of the original fed by said original feeder;
   a second illumination unit configured to illuminate the original to be read by said second reader; and
   a controller configured to cause said first and second readers to read respective first and second reference objects, and generate correction data for said first reader and correction data for said second reader based on the respective first and second reference objects read by said first and second readers,
   wherein a time period required for reading the second reference object by said second reader and for generation of the second correction data is longer than a time period required for reading the first reference object by said first reader and for generation of the first correction data, and wherein said controller causes said second illumination unit to start illuminating the second reference object before causing said first illumination unit to start illuminating the first reference object.

8. An image reading apparatus comprising:
an original feeder configured to feed an original;
a first reader configured to read an image on one side of the original fed by said original feeder, said first reader being formed by a single reading sensor chip;
a first illumination unit configured to illuminate the original to be read by said first reader;
a second reader disposed downstream of said first reader in a direction in which the original is fed by said original feeder, and configured to read an image on another side of the original fed by said original feeder, said second reader being formed by a plurality of reading sensor chips arranged in a row;
a second illumination unit configured to illuminate the original to be read by said second reader; and
a controller configured to cause said first and second readers to read respective first and second reference objects, and generate correction data for said first reader and correction data for said second reader based on the respective first and second reference objects read by said first and second readers,
wherein said controller causes said second illumination unit to start illuminating the second reference object before causing said first illumination unit to start illuminating the first reference object.

9. An image reading apparatus comprising:
an original feeder configured to feed an original;
a first reader of a CCD type, which is configured to read an image on one side of the original fed by said original feeder;
a first illumination unit configured to illuminate the original to be read by said first reader;
a second reader of a CIS type, which is disposed downstream of said first reader in a direction in which the original is fed by said original feeder, and is configured to read an image on another side of the original fed by said original feeder;
a second illumination unit configured to illuminate the original to be read by said second reader; and
a controller configured to cause said first and second readers to read respective first and second reference objects, and generate correction data for said first reader and correction data for said second reader based on the respective first and second reference objects read by said first and second readers,
wherein said controller causes said second illumination unit to start illuminating the second reference object before causing said first illumination unit to start illuminating the first reference object.

10. A control method for an image reading apparatus comprising an original feeder configured to feed an original,
a first reader configured to read an image on one side of the original fed by the original feeder,
a first illumination unit configured to illuminate the original to be read by the first reader,
a second reader disposed downstream of the first reader in a direction in which the original is fed by the original feeder and configured to read an image on another side of the original fed by the original feeder,
a second illumination unit configured to illuminate the original to be read by said second reader, and
first and second reference objects for generating first correction data for said first reader and second correction data for said second reader,
wherein a time period required for reading the second reference object by said second reader and for generation of the second correction data is longer than a time period required for reading the first reference object by said first reader and for generation of the first correction data,
the control method comprising the steps of:
causing the second illumination unit to start illuminating the second reference object before causing the first illumination unit to start illuminating the first reference object;
causing the first and second readers to read respective first and second reference objects; and
generating correction data for the first reader and correction data for the second reader based on the respective first and second reference objects read by the first and second readers.

11. An image reading apparatus comprising:
an original feeder configured to feed an original;
a first reader configured to read an image on one side of the original fed by said original feeder, said first reader having a reading sensor formed by a single sensor chip as a CCD scanner type and having a first illumination unit configured to illuminate a first reference object;
a second reader disposed downstream of said first reader in a direction in which the original is fed by said original feeder and configured to read an image on another side of the original fed by said original feeder, said second reader having a reading sensor formed by a plurality of sensor chips arranged in a row as a CIS scanner type and having a second illumination unit configured to illuminate a second reference object; and
a controller configured to cause said first and second readers to read respective the first and second reference objects, and generate first correction data for a shading correction of said first reader and second correction data for a shading correction of said second reader based on the respective first and second reference objects read by said first and second readers,
wherein said controller generates the second correction data for correcting a density differences in junctures between adjacent ones of the plurality of sensor chips, causes the second illumination unit to start illuminating the second reference object before causing the first illumination unit to start illuminating the first reference object, and causes said second reader to start reading the second reference object before causing said first reader to start reading the first reference object, such that generation of the first correction data is completed prior to or simultaneously with completion of generation of the second correction data.

12. An image reading apparatus as claimed in claim 11, wherein the first reference object and the second reference object are white reference plates, respectively.

* * * * *